United States Patent Office 3,064,040
Patented Nov. 13, 1962

1

3,064,040
CARBONYLATION OF MONOOLEFINS WITH CARBON MONOXIDE AND WATER IN THE PRESENCE OF HYDROGEN AND A COBALT CATALYST
Peter P. Klemchuk, Nixon, N.J., assignor to Esso Research and Engineering Company, a corporation of Delaware
No Drawing. Filed Apr. 9, 1959, Ser. No. 805,146
7 Claims. (Cl. 260—514)

The invention relates to the preparation of oxygenated organic compounds from olefins by reaction with carbon monoxide and water in the presence of a catalyst and hydrogen. More specifically, the invention concerns an improved process for preparing organic acids from olefins which involves the use of small amounts of hydrogen to substantially increase the rate of reaction.

Heretofore, as shown in U.S. Patent No. 2,448,368, issued August 31, 1948 to Gresham et al., it has been proposed to condense an olefinic compound with carbon monoxide and water in the presence of a metal-containing catalyst, the metal of which is selected from Group VIII of the Periodic Chart of Elements on pages 56–57 of Lange's "Handbook of Chemistry," 8th edition, to produce an organic carboxylic acid containing one more carbon atom than the number of carbon atoms in the olefin. It is an object of this invention to provide a method for increasing the reaction rate of olefins, carbon monoxide and water to produce the aforesaid organ carboxylic acids.

It has been discovered that the rate of conversion of the reactants to the desired acid can be substantially increased by adding relatively small amounts of hydrogen to the reaction mixture. By adding a minor but critical amount of hydrogen gas to the reaction zone, preferably with the carbon monoxide, it is possible to increase the reaction rate as much as threefold. Moreover, the hydrogen permits the use of smaller quantities of catalyst and therefore its use involves an additional economic gain. It is believed that the hydrogen reacts with the catalyst and maintains it at a high level of activity. The amount of hydrogen employed will, of course, depend to some extent upon the pressure and temperature at which the reaction is carried out, however, the molar ratio of carbon monoxide to hydrogen in the reaction zone should be at least 6. While the molar ratio of carbon monoxide to hydrogen may be as much as 30, the most outstanding improvements in reaction rate are obtained with molar ratios of 10 to 20.

In carrying out the invention, 1 mole of a $C_2$ to $C_{18}$ olefin, e.g. an alpha olefin, is charged to a reaction zone together with about 1 to 4 moles of water, which may be in the form of steam, and a synthesis gas containing from 6 to about 30 moles of carbon monoxide per mole of hydrogen. The reactants are contacted with 0.2 to 10 mole percent, based on the olefin, of a suitable carbonylation catalyst, such as cobalt carbonyl. The pressure in the reaction zone exerted by the synthesis gas is generally between 1000 and 5000 p.s.i.a., although the pressures of 1500 to 3000 p.s.i.a. are more commonly used. The temperature in the reaction zone is adjusted to between 100 and 200° C., preferably between 140 and 180° C., and maintained at that level until the reaction is complete. In a batch operation the reaction time may be as long as 10 hours or more, however, it is generally between about 1 and 5 hours when the molar ratio of carbon monoxide to hydrogen is between 10 and 20.

While it is not essential to use a diluent, it has been found that there are several advantages to carrying out the reaction in the presence of a substantial quantity of a relatively inert organic diluent or solvent. While many organic diluents, including $C_4$ to $C_8$ hydrocarbons such as heptane, may be employed, it is preferred to use an oxygenated organic compound, such as a ketone or ether. Among the diluents suitable for use in this process are diethyl ether, tetrahydrofuran, dioxane and especially acetone. The oxygenated diluents, which may be used in amounts of 100 to 1000 wt. percent based on the olefin, not only assist in the dissipation of heat from the reaction zone but also serve as solvents for the olefin and water. The ketone and ether diluents that are most satisfactory contain from 3 to 6 carbon atoms.

The yield of acid based on the olefin obtained by this process is generally somewhat better than that obtained when no hydrogen is employed. Yields ranging from 50% to 80% or more can be obtained by the process. While the use of hydrogen has an effect on the yield, the principal benefits derived from the invention are an increased reaction rate and a low catalyst consumption. If one wishes to sacrifice the increased reaction rate gotten in this process, it is possible to use about 15 or 20% of the amount of catalyst ordinarily employed and still have approximately the same reaction rate.

The olefin feed should contain an acyclic or cyclic olefin, which contains 1 to 2 double bonds, that is substantially free of other reactive substances. The preferred feed is a relatively pure monoolefin containing from 2 to 12 carbon atoms. The most commonly used acyclic monoolefins are those which have the double bond in the alpha position. Among the olefins which are suitable for the purposes of the present invention are propylene, hexene-1, heptene-1, cyclohexene, butene-1, isobutene, pentene-1, tripropylene and ethylene.

While any of the catalysts known in the carbonylation art may be employed, the most efficient catalyst is one containing cobalt either as a carbonyl or a salt of a $C_2$ to $C_{18}$ fatty acid, such as cobalt oleate. In some instances it is possible to use as little as 0.2 to 0.5 mole percent cobalt catalyst and still achieve reaction rates equivalent to those obtained with three or more mole percent of the same catalyst.

While the use of hydrogen produces a small quantity of aldehyde in the reaction zone, this does not adversely affect the yield because the aldehyde is readily oxidized to the corresponding acid. Moreover, the increase in reaction rate far outweighs the cost of converting a small quantity of aldehyde to acid.

The following examples illustrate how the improved process may be carried out and demonstrate the advantages already described.

EXAMPLE 1

The following experiments were carried out to demonstrate the effect of hydrogen on the reaction rate of an acid synthesis. To a 300 ml. bomb were charged 25 ml. of cyclohexene, 63.5 ml. of acetone, 13.5 ml. of water and a cobalt hydrocarbonyl catalyst in the amount shown in the table below. The bomb was then pressured to 2500 p.s.i.a. with synthesis gas and the reaction was carried out at 165° C. The data obtained from these experiments are set forth in the following table:

*Acid Synthesis With Cyclohexene*

| Run No. | $CO/H_2$ | $Co_2(CO)_8$ (Mole Percent) | Reaction Rate $\Delta P$(p.s.i.)/Min. | Gas Consumption (percent of theory) | Acid,[1] Percent Yield |
|---|---|---|---|---|---|
| 1 | 1/0 | 3 | $9.7 \times 10^{-3}$ | 65 | 64 |
| 2 | 15/1 | 3 | $29 \times 10^{-3}$ | 93 | 75 |
| 3 | 15/1 | 0.5 | $10 \times 10^{-3}$ | 82 | 53 |
| 4 | 7/1 | 0.5 | $12.6 \times 10^{-3}$ | 101 | 52 |

[1] Including yield from aldehyde oxidation.

The data show that the reaction rate was almost tripled when one mole of hydrogen was introduced into the reaction zone per 15 moles of carbon monoxide. Run 3 demonstrates that the use of a small amount of hydrogen allows a substantial reduction in catalyst concentration while maintaining the reaction rate obtained with the larger amount of catalyst used in the control (Run 1). It will be noted that as the carbon monoxide to hydrogen molar ratio approaches 6:1 the gas consumption exceeds 100 indicating that a substantial amount of the hydrogen is being consumed. The presence of large amounts of hydrogen in the reaction zone favors a hydroformylation reaction which adversely affects the acid synthesis. To avoid this undesirable side reaction, it is advisable to maintain the molar ratio of carbon monoxide to hydrogen between 10 and 30.

EXAMPLE 2

Run 2 in Example 1 is repeated with the exception that pentene-1 is employed in place of the cyclohexene. The reaction rate is substantially increased over that of the control in which no hydrogen is used.

EXAMPLE 3

Example 2 is repeated with the exception that propylene is employed in place of pentene-1. The reaction rate is substantially increased over that of the control.

Resort may be had to various modifications and variations of the present invention without departing from the spirt of the discovery or the scope of the appended claims.

What is claimed is:

1. A process for preparing organic carboxylic acids which consists essentially of contacting in a reaction zone one mole of a $C_2$ to $C_{18}$ monoolefin which contains its double bond in alpha position with about 1 to 4 moles of water under 1000 to 5000 p.s.i.a. pressure exerted by a mixture of carbon monoxide and hydrogen supplied to said reaction zone in a ratio of from about 10 to 30 moles of carbon monoxide per mole of hydrogen in the presence of 0.2 to 10 mol. percent based on the monoolefin of a cobalt-containing carbonylation catalyst, maintaining the temperature in the reaction zone between about 100 and 200° C. for from a few minutes to about 10 hours and recovering an organic carboxylic acid from the reaction mixture having one more carbon atom per molecule than the feed olefin.

2. A method for preparing organic carboxylic acids which consists essentially of contacting in a reaction zone 1 mole of a $C_2$ to $C_{12}$ acyclic monoolefin having its double bond in alpha position with about 1 to 4 moles of water under 1000 to 5000 p.s.i.a. pressure exerted by a mixture of carbon monoxide and hydrogen supplied to said reaction zone in a ratio of about 10 to 20 moles of carbon monoxide per mole of hydrogen, in the presence of about 0.2 to 0.5 mole percent, based on the monoolefin, of cobalt carbonyl carbonlyation catalyst, maintaining the temperature in the reaction zone between about 140 and 180° C. for from a few minutes to about 10 hours and recovering an organic carboxylic acid from the reaction mixture having one more carbon atom per molecule than the feed olefin.

3. A method according to claim 1 in which the carbon monoxide and hydrogen are supplied to the reaction zone in a ratio of about 10 to 20 moles of carbon monoxide per mole of hydrogen.

4. A method according to claim 1 in which the catalyst is cobalt carbonyl.

5. A method according to claim 1, in which the monoolefin contains 2 to 12 carbon atoms.

6. A method according to claim 1 in which the monoolefin is cyclohexene.

7. A method according to claim 1 in which the monoolefin is pentene-1.

References Cited in the file of this patent

UNITED STATES PATENTS

| | | |
|---|---|---|
| 2,587,858 | Keulemans | Mar. 4, 1952 |
| 2,911,422 | Ercoli | Nov. 3, 1959 |
| 2,911,443 | Reed et al. | Nov. 3, 1959 |